May 13, 1958 T. L. FAWICK 2,834,636
FORGED WHEEL
Filed Oct. 28, 1953 3 Sheets-Sheet 1

INVENTOR.
THOMAS L. FAWICK
BY Willard D. Eakin
ATTY.

May 13, 1958

T. L. FAWICK 2,834,636

FORGED WHEEL

Filed Oct. 28, 1953

INVENTOR.
THOMAS L. FAWICK
BY Willard D. Eakin
ATTY.

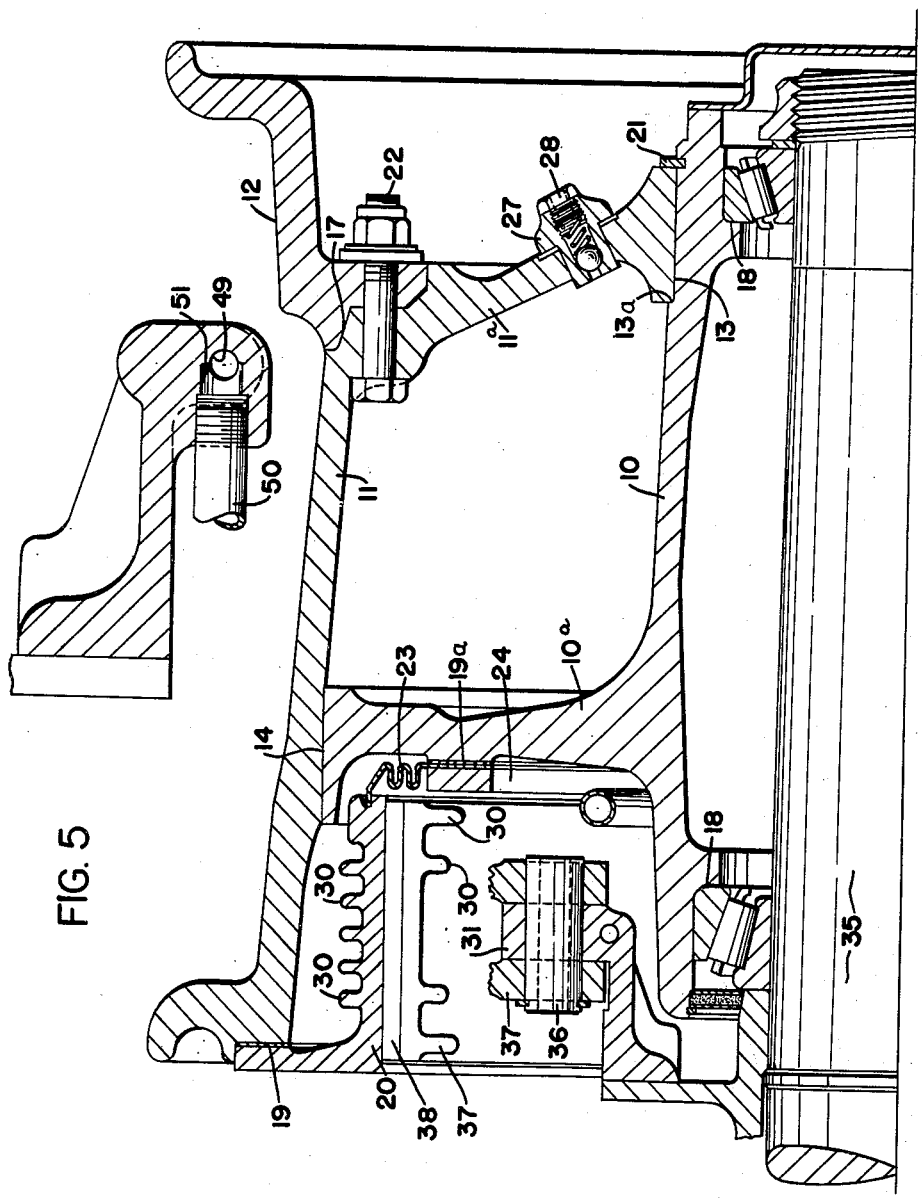

United States Patent Office 2,834,636
Patented May 13, 1958

2,834,636
FORGED WHEEL

Thomas L. Fawick, Cleveland, Ohio

Application October 28, 1953, Serial No. 388,799

2 Claims. (Cl. 301—6)

This invention relates to vehicle wheels, and especially to light wheels suitable for use upon airplanes, and to procedure for making them.

Its chief objects are to provide economically a light but strong and durable wheel; to provide in an improved manner a hollow wheel body inclusive of a brake-drum and adapted to contain a cooling liquid or other material for preventing excessive heating of the brake-drum; and to provide, in combination with such a wheel, a brake assembly adapted to provide a widely and evenly distributed generation of the frictional heat of braking action, for avoidance of distortion of brake and wheel parts, as a factor in permitting lightness of construction.

Of the accompanying drawings:

Fig. 4 is an axial section of the same on line 4—4 of Fig. 1.

Fig. 5 is a section on line 5—5 of Fig. 1.

Figure 3:
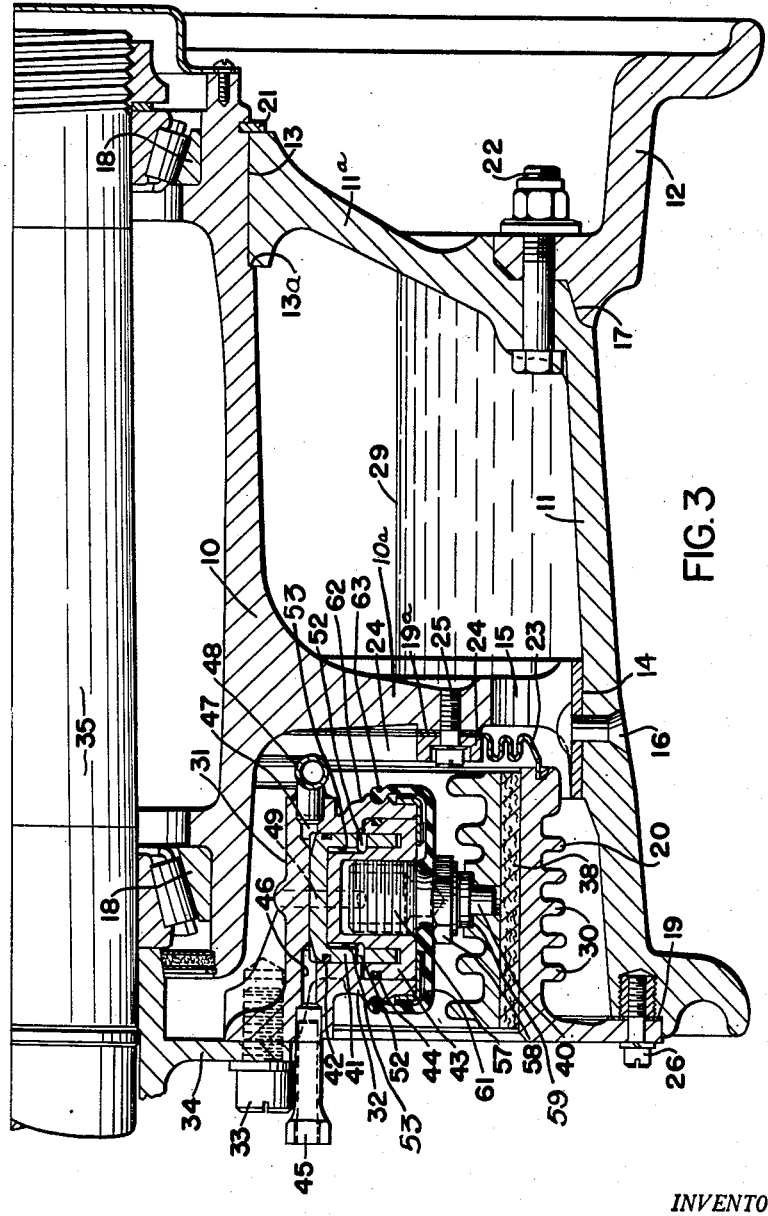
Fig. 3 is an axial section, on line 3—3 of Fig. 1, of the wheel and brake assembly represented in Fig. 1.

In making the wheel body, a hub and wall part 10, a tire-rim and wall part 11 and a tire-seating and retaining ring 12, preferably all of light and strong metal such as an aluminum alloy, are individually forged in annular form and approximately to the cross-sectional shapes in which they are shown in Figs. 3 and 4, wherein the hub part 10 is shown as having an outwardly projecting spoke portion 10ª integral therewith and the tire-rim part 11 is shown as having an inwardly projecting spoke portion 11ª integral therewith.

The parts 10 and 11 are cylindrically machined on their faces that are required to interfit, at 13 and 14, but with the inner diameters of the part 11 at those positions slightly less than the outer diameters of the part 10 at those positions.

The part 11 is then shrunk onto the part 10 in the relationship in which they are shown, preferably with pre-cooling of the part 10 as well as pre-heating of the part 11.

The part 11 is formed, either in the forging or by subsequent drilling with a circumferentially spaced set of holes 15, 15 for flow of cooling liquid through them and at the position of each hole 15 to part 11 is secured upon the part 10 by a rivet 16.

Thereafter the three forgings, of which 10 and 11 are now in permanently fixed relationship, are circularly machined as may be necessary for interfit of the ring 12 with the part 11 at 17, of the part 10 with bearing races at 18, 18, and of the parts with gaskets 19, 19ª sealing it to respective annular margins of a structure comprising a beryllium bronze L-section brake-drum 20.

In the mounting of the part 11 upon the part 10, the part 11 at 13 preferably is held against a shoulder 13ª upon the part 10 by a snap-ring 21 seated in a groove in the part 10.

The tire-seating and retaining ring 12 is then mounted and secured to the part 11 by bolts 22.

The heat-conductive brake-drum 20 has welded to its axially inner margin the radially outer margin of an annular metal diaphragm 23, the inner margin of which is sealingly clamped against the gasket 19ª by a ring 24 drawn toward the wheel-body member 10 by bolts 25. The outwardly projecting radial flange of the brake-drum 20 is sealingly clamped against the gasket 19 by bolts 26, Fig. 3, drawing it toward the wheel-body member 11.

The assembly comprising the forged wheel-body members, the brake-drum 20 and the diaphragm 23 thus constitute a hollow wheel assembly adapted to contain a cooling liquid, such as water or oil, or other cooling material, with the coolant free to flow, through the holes 15, from the main cavity of the wheel into and out of the space surrounding the brake-drum, in which it directly contacts the highly heat-conductive beryllium bronze brake-drum 20 for effective transfer and dissipation of the frictional heat of braking.

A filler hole and plug 27 are provided for putting in and removing the coolant and a safety relief valve 28 is provided, preferably in a central aperture in the plug 27 as shown.

Whenever the wheel is rotating, frictional contact of the coolant with the inner walls of the wheel body induce rotation of some or all of the coolant with the wheel, and centrifugal force causes a good distribution of the coolant in the part of the chamber that surrounds the brake-drum, and, with a suitable amount of coolant, as indicated by the liquid-level line 29 in Fig. 3, a complete filling of that part of the chamber, for contact of the coolant with the brake-drum throughout the wheel circle. Preferably the brake-drum is formed with heat-transfer ring annular ribs 30, 30 on its coolant-contacting face.

The preferred brake for use in association with the wheel as described comprises a torque-sustaining annular casting 31 which is integrally formed with three circumferentially spaced, outwardly open, cylinder chambers 32, 32, the casting 31 being secured by bolts 33, 33 to a torque-flange 34 mounted upon the axle 35.

Hinged at 36, 36 upon the casting 31 are circumferentially spaced brake-shoes 37, 37, with respective friction facings 38, 38, for hinging movements all in the same rotative direction, for coaction with the inner face of the brake-drum 20.

For retracting the brake-shoes each is connected, near its outer end, by a pull spring 39, with the casting 31. The brake-engaging mechanism comprises piston structures mounted in the respective cylinder chambers 32 and adapted to exert radially outward pressure against respective pressure-sustaining plugs, such as the plug 40, Fig. 1, each mounted in the respective shoe at a position between the shoe's hinge-axis 36 and its retracting spring 39.

Some of the features of the cylinders 32 and their piston structures are described and more broadly claimed in my copending application Serial No. 342,891, filed March 17, 1953, now Patent No. 2,766,591.

Each cylinder chamber has, in continuation of each other, a radially inner part of relatively small diameter, in which a piston element 41, with a packing ring 42, is mounted, and a radially outer part of larger diameter in which a piston element 43, with a packing ring 44, is mounted.

The piston element 41 is of cup shape and slidably fitting within it is a guide-stem portion of the element 43, and the wall of the cup-shaped elements 41 slidably fits against the said stem portion in an annular guide groove formed in the element 43.

For supplying pressure fluid to the piston elements 41, a supply nipple 45 (Figs. 1 and 3) is mounted in a socket which has an inward extension 46, Fig. 3, communicating with the pressure-receiving face of one of the piston elements 41 and, through a triangular annular passage 47 formed by a bevel of the base corner of that element, with a circumferentially disposed pipe 48 mounted upon the casting and having communication with the other ones of the piston elements 41.

The construction just described is such that when pressure fluid is supplied to the piston elements 41 it will drive both of the piston elements of each pair radially outward, against the force of the springs 39, the recoil of which will then return both of the piston elements of each pair, in the retraction of the brake-shoes.

Figure 1:
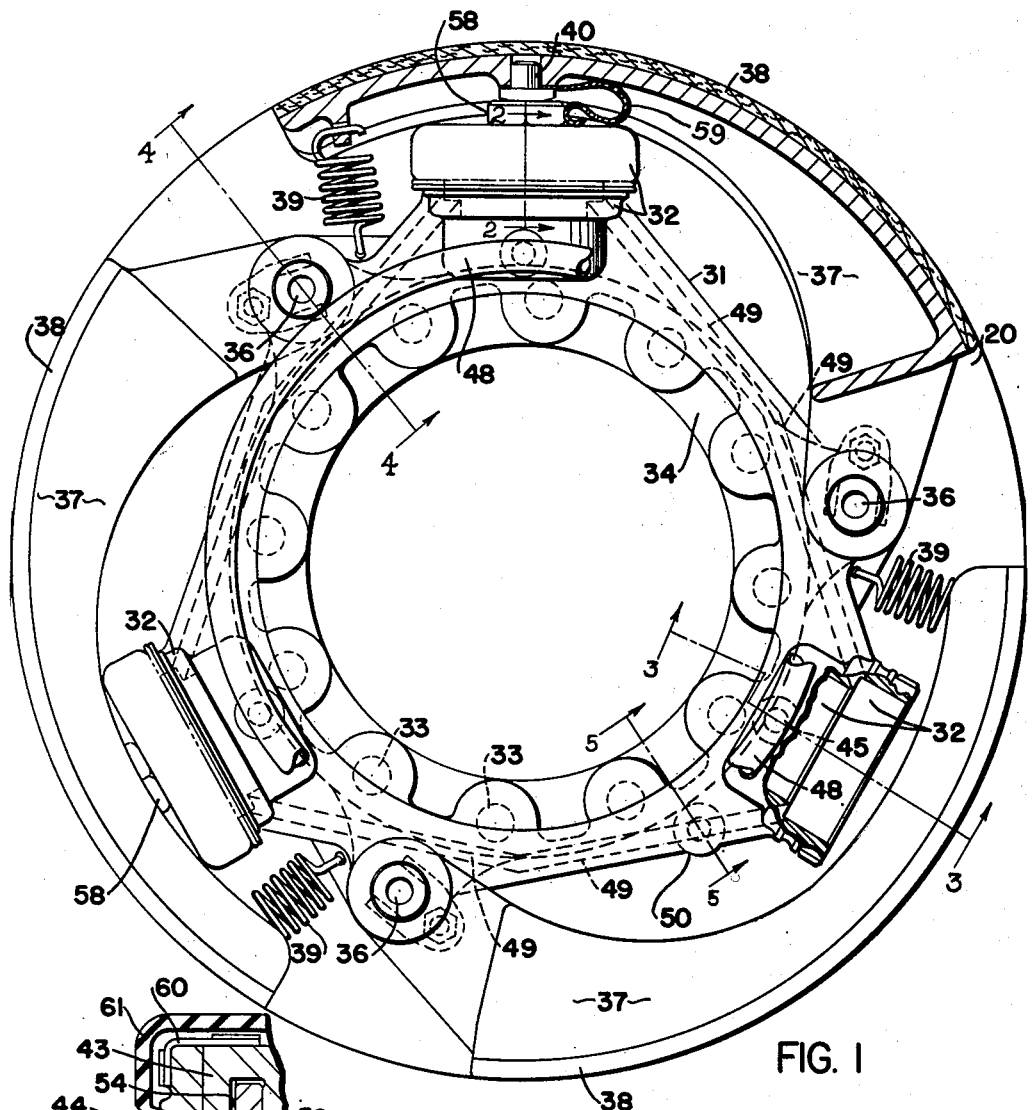
Fig. 1 is an elevation, with parts sectioned and broken away, and with parts omitted for clearness of illustration, of a brake which is a part of the assembly, embodying my invention in its preferred form, taken from the side of the brake that is nearest the wheel body (from the right of Figs. 3 and 4).

For supplying pressure fluid between the two piston elements of each pair the casting 31 is formed, preferably by drilling from the interior of the cylinders, with a series of connecting passages 49, 49 opening into each cylinder chamber at the position of the shoulder at the junction of its large-diameter and small-diameter parts, and a supply nipple 50, Figs. 1 and 5, is mounted in a socket in the casing which, through an extension 51, Fig. 5, is in communication with the interconnected series of passages 49.

Figure 2:
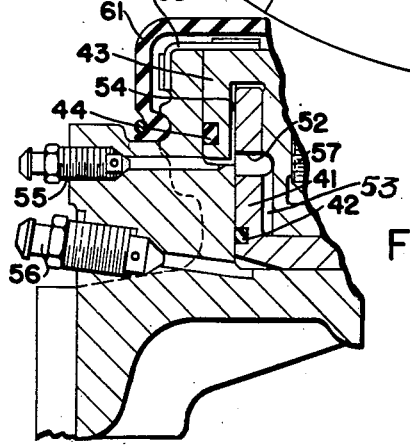
Fig. 2 is a section on line 2—2 of Fig. 1.

To permit pressure fluid entering the cylinder chamber from the passages 49 to exert its pressure promptly throughout the cross-sectional area of the piston element 43 the wall of the element 41 is formed with holes 52, 52, the stem portion of the element 43 is provided with grooves 53, 53, and the inner face of the skirt portion of the element 43 has slight clearance from the outer face of the element 41 in their overlapped portions or may be formed with one or more grooves such as the groove 54, Fig. 2.

Fig. 2 shows bleeder plugs 55, 56, suitably mounted in the wall of the uppermost cylinder for permitting complete expulsion of air from the respective pressure fluid systems in case of filling either or both with a liquid for hydraulic actuation.

For adjustably transmitting the force of each piston assembly to its brake shoe, a presser plug 57, hollowed out from its inner end for lightness, is threaded into the stem portion of the piston element 43 and outside of the latter is formed at 58 for the reception of a turning wrench, and is adapted for its outer end face to abut the plug 40 of the brake-shoe for actuation of the shoe.

Because the cylinder is integral with the torque-plate casting so that the piston structure has only directly radial movement, whereas the brake-shoe has a slight hinging movement, at least one of the contacting faces of the plugs 40 and 57 preferably is slightly rounded, for rolling contact with the other plug, but in view of the short range of the hinging movements of the shoes this is not indispensible. The range of engaging and disengaging movement of the shoe can be kept very small by adjustment of the screw plugs 57 to compensate for wear of the facings of the shoes.

For holding the screw plug 57 in its rotative position of adjustment a spring 59 is secured at one end under the head of the plug 40 and at its other end bears against one or another of the flat faces of the wrench-receiving part 58 of the screw plug.

For keeping moisture and dirt out of the cylinder-and-piston structures I preferably provide resilient closure means such as a cup-shaped fabric and metal structure 60 and a cup-shaped member 61 of an oil resistant synthetic rubber and formed with a central hole occupied by a waist portion of the screw plug 57, and with a circumferential anchoring bead 62 snapped into an annular groove formed in the outer face of the cylinder element, and retained therein by a wire 63.

The manner in which the assembly operates will be manifest from the foregoing description.

Specific advantages are that with the brake-drum 20 formed of highly heat conductive material as described, and effectively cooled by a flowable substance contained in the hollow wheel-body, it is not necessary for the wheel body to be made of highly heat-conductive or heat-absorbing material and yet the temperature is kept sufficiently low to avoid warping of the parts of the wheel body adjacent the brake drum, and to avoid loosening of the temperature-fitted junctions 13, 14, while undue warping of parts by braking pressure is avoided by reason of the several brake shoes being evenly spaced about the wheel circle, all urged in the same rotative direction for engagement, by forces applied to their respective middle parts, with delicate adjustment by means of the respective adjusting screw plugs 57, all of these things contributing to a continuingly dependable even distribution of braking pressure.

The metal diaphragm 23 also contributes to avoidance of undue warping of wheel-body parts by heat or by pressure, as does also the gasket 19, by reason of their having resilience, so that, while retaining the cooling liquid in the wheel they do not transmit excessively strong forces from the brake-drum to the wheel body.

The holes 15 in the flange portion of the forged and machined member 10 not only provide for the passing of cooling liquid to and from the space surrounding the brake-drum but also provide for the use of the rivets 16 at the positions of the respective holes 15 while the member 10 is left at full strength throughout the circle of the assembly except at the holes 15.

The piston-and-cylinder assembly as described permits the employment of the force of the small-diameter piston element 41 only, with small fluid displacement, for service braking, and with either a liquid or air as the pressure fluid, and the use of the piston element 43 of larger diameter, with either a liquid or air, for heavier braking or for emergency braking in case of failure of the service-braking system.

The fineness of adjustment of the screw-plugs 57 makes possible an always short range of engaging and disengaging movement of the shoes, and this permits the cylinder-and-piston assembly to be of short radial dimensions, while the telescoped relationship of the two piston elements provides sufficiently long-span guiding of them in spite of their large diameters in relation to the over-all length of the assembly.

All of the advantages referred to are factors in permitting the use of the forged wheel-body as described, with adequate strength and with economy of metal, of labor and of transportation costs as compared with machining the wheel body from a single metal casting of the necessarily greater weight.

Modifications are possible without departure from the scope of the invention as defined in the appended claims.

I claim:

1. A wheel and brake assembly comprising a plurality of forged wheel-body parts and a separately formed, highly heat-conductive brake-drum, sealingly secured to one another and defining a coolant-retaining space in direct communication with only a face of the said brake-drum that is not its friction face, a torque-sustaining brake-shoe mounting, a plurality of brake-shoes hinged on said mounting for movement of all of them in the same rotative direction for frictional engagement with said brake-drum, a pull spring connecting each of said brake-shoes near its outer end with said brake-shoe mounting for retracting the shoes respectively, actuating means for exerting engaging pressure against each shoe at a position between its spring and its hinge axis, and adjustable force-transmitting means between each of the actuating means and the shoe that it actuates, for compensation of wear of the shoes, each of the said wheel-body parts being of a shape permitting it to be formed wholly by forging approximately to its final shape.

2. A wheel-body structure in combination with a separately formed brake-drum of L shape in cross section, having a drum portion with a cylindrical friction face and at an annular margin thereof a disc-shaped attachment portion, means for securing and sealing said attachment portion to said wheel body structure, and a diaphragm element sealingly connecting the other margin of said drum portion with said wheel-body structure, the recited elements defining a coolant-retaining chamber in communication with a surface of the said brake-drum.

References Cited in the file of this patent

UNITED STATES PATENTS

| | | |
|---|---|---|
| 1,413,051 | Michelin | Apr. 18, 1922 |
| 1,550,833 | Meyers | Aug. 25, 1925 |
| 1,685,849 | Jernberg | Oct. 2, 1928 |
| 1,906,520 | Bode | May 2, 1933 |
| 2,016,435 | Isidin | Oct. 8, 1935 |
| 2,040,589 | Avery | May 12, 1936 |
| 2,118,018 | Swanson | May 17, 1938 |
| 2,406,303 | Levy | Aug. 20, 1946 |
| 2,479,795 | Vrooman | Aug. 23, 1949 |
| 2,513,192 | McFarland | June 27, 1950 |
| 2,574,323 | Flowers | Nov. 6, 1951 |

FOREIGN PATENTS

| | | |
|---|---|---|
| 759,942 | France | Dec. 6, 1933 |